(12) United States Patent
Zhou et al.

(10) Patent No.: US 7,733,225 B2
(45) Date of Patent: Jun. 8, 2010

(54) INTELLIGENT SECURITY APPARATUS FOR CONTAINER AND MECHATRONIC CUSTOMS SEAL, BRACKET

(75) Inventors: Shouqin Zhou, Shenzhen (CN); Tao Peng, Shenzhen (CN)

(73) Assignee: China International Marine Containers (Group) Ltd., Shenzhen (CN)

( * ) Notice: Subject to any disclaimer, the term of this patent is extended or adjusted under 35 U.S.C. 154(b) by 325 days.

(21) Appl. No.: 11/861,176

(22) Filed: Sep. 25, 2007

(65) Prior Publication Data

US 2008/0094173 A1 Apr. 24, 2008

(30) Foreign Application Priority Data

Oct. 18, 2006 (CN) .................. 2006 1 0063252

(51) Int. Cl.
*G08B 13/08* (2006.01)
(52) U.S. Cl. .................. 340/545.1; 340/545.6
(58) Field of Classification Search ............. 340/545.1, 340/545.2, 545.4, 545.6, 546, 550; 200/61.62
See application file for complete search history.

(56) References Cited

U.S. PATENT DOCUMENTS

| | | | | |
|---|---|---|---|---|
| 6,870,476 | B2* | 3/2005 | Cockburn et al. | 340/545.6 |
| 7,417,543 | B2* | 8/2008 | Bergman et al. | 340/545.6 |
| 7,436,298 | B2* | 10/2008 | Rajapakse et al. | 340/545.6 |
| 2003/0206104 | A1* | 11/2003 | Lowry et al. | 340/545.1 |
| 2008/0061924 | A1* | 3/2008 | Labowicz et al. | 340/545.2 |

FOREIGN PATENT DOCUMENTS

| | | |
|---|---|---|
| CN | 2682034 | 3/2005 |
| CN | 1623866 | 6/2005 |

* cited by examiner

*Primary Examiner*—John A Tweel, Jr.
(74) *Attorney, Agent, or Firm*—Workman Nydegger

(57) ABSTRACT

The present invention discloses an intelligent security apparatus for container, a mechatronic customs seal and a bracket, a bracket, internally installed with an antenna, a processing circuit and power with electrical connection thereamong and mounted on a door of a container; a hole for fitting a customs seal, opened on the bracket; and a mechatronic customs seal, internally provided with a detecting wire and a chip written with ID code and inserted through the hole in the bracket and lock rod handle; wherein the mechatronic customs seal is inserted in the hole of the bracket, the detecting wire and the chip written with ID code in the mechatronic customs seal is electrically connected to the processing circuit in the bracket. The intelligent security apparatus provided by the present invention has physical seal structure and electrical real-time monitoring function at the same time. While checking the integrality of the physical structure via visual observation, the apparatus can also perform electrical real-time monitoring and recording for the seal status. By adopting the principle of integrating mechanism and electronics, the mechatronic customs seal enables electrical detection and one-off physical structure, which ensures high security; the data storing and transmitting section of the bracket are reusable, and hence solve the problem of costly traditional one-off electrical seal.

21 Claims, 4 Drawing Sheets

INTELLIGENT SECURITY APPARATUS FOR CONTAINER AND MECHATRONIC CUSTOMS SEAL, BRACKET

FIELD OF THE INVENTION

The present invention relates to an apparatus for detecting illegal unlocking of a door of a container, and in particular, relates to an intelligent security apparatus with physical seal structure and electrical real-time monitoring function at the same time.

Furthermore, the present invention relates to a mechatronic customs seal with physical seal structure and electrical real-time monitoring function at the same time.

Furthermore, the present invention relates to a bracket with electrical monitoring function that is used in association with the mechatronic customs seal.

BACKGROUND OF THE INVENTION

As a means of freight, the container has been developing into a universal standard multimodal transportation tool since 1960s.

However in recent years, as the safety consciousness of preventing risks and terrorist activities is raising generally in the world, the security requirement of containers during transportations becomes more and more highlighted, one item of which is that the importing containers possess explicit safeguard measures to ensure the safety since its departure. In other words, the importing container is not allowed to be illegally unlocked.

Traditional door sealing apparatus of containers is custom seal. While a container is closed, the custom seal gets through seal fitting holes of lock rod handle, handle bracket and hasp cover.

At present, in the field of containers, some intelligent security apparatuses, e.g. the China patent application CN200420002682.1 and CN200410056197.7 filed by the applicant of the present invention, are designed for detecting unlocking container door in real-time. However, all these intelligent security apparatuses perform detection independently and without any relations to the traditional custom seal.

In conclusion, there are many disadvantages in current security measures of containers, which need to be improved.

SUMMARY OF THE INVENTION

The objective of the present invention is to provide an intelligent security apparatus with physical seal structure and electrical real-time monitoring function at the same time based on improving the traditional seal improvement. While checking the integrality of the physical structure via visual observation, the apparatus can also perform electrical real-time monitoring and recording for the seal status, hence to ensure the safety.

Another objective of the present invention is to provide a mechatronic customs seal with physical seal structure and electrical real-time monitoring function at the same time based on improving the traditional seal and integrating mechanism and electronics.

Furthermore, another objective of the present invention is to provide a bracket of container with electrical monitoring function to match the mechatronic customs seal.

In order to realize the above objectives, technical solutions of the present invention are disclosed as follows:

An intelligent security apparatus for container, comprising: a bracket, internally installed with an antenna, a processing circuit and power with electrical connection thereamong and mounted on a door of a container; a hole for fitting a customs seal, opened on the bracket; and a mechatronic customs seal, internally provided with a detecting wire and a chip written with ID code and inserted through the hole in the bracket and lock rod handle; wherein the mechatronic customs seal is inserted in the hole of the bracket, the detecting wire and the chip written with ID code in the mechatronic customs seal is electrically connected to the processing circuit in the bracket.

According to the intelligent security apparatus for container, the chip written with ID code is a read-only chip.

According to the intelligent security apparatus for container, the detecting wire is cut off to match the outspread implantation of the mechatronic customs seal synchronously.

According to the intelligent security apparatus for container, the mechatronic customs seal comprises: a bolt, comprising a cylindrical pin packaged with the detecting wire and the chip, and a head arranged on one end of the pin; and a lock head, separated from the bolt when being free, and unable to be removed once inserted with the other end of the pin of the bolt when working.

According to the intelligent security apparatus for container, first conducting plates, which are connected with the detecting wire and the chip respectively, are provided on the outer surface of the bolt of the mechatronic customs seal; second conducting plates, which are connected with the processing circuit, are provided on the wall of the hole on the bracket; the first conducting plates match the second conducting plates to form the electrical circuit connection, while the mechatronic customs seal is inserted into the hole.

According to the intelligent security apparatus for container, a guide bar is provided on the outer surface of the bolt, a guide slot on the wall of the hole correspondingly, and the guide bar fits in the guide slot accordingly while the mechatronic customs seal is inserted in the bracket.

According to the intelligent security apparatus for container, the bracket is mounted on the outer side of the door of the container.

According to the intelligent security apparatus for container, the bracket is fixed on the door of the container in a manner that the hole on the bracket and the antenna packaged in the bracket are exposed outside the container, while the rest are located inside the container.

According to the intelligent security apparatus for container, the processing circuit at least comprises: a control unit, to process data; an interface management module, connected with the control unit, further connected with the detecting wire and the chip in the mechatronic customs seal while the mechatronic customs seal is inserted in the hole of the bracket; a data storage module, connected with the control unit, to store data; a clock module, connected with the control unit, to provide real-time clock; a radio-frequency transceiver module, connected with the control unit and the antenna; a power management module, connected with the control unit, to supply steady electric energy to each module and unit; and a voltage monitoring module, connected with the control unit, to monitor the voltage status of the system.

According to the intelligent security apparatus for container, the processing circuit performs operations as follows: detecting step, to detect the on/off status of the detecting wire of the mechatronic customs seal, and if it is on, then send an startup signal to enter next step; if it is off, then send an alarm and write the current time into the storage module; reading step, to read the ID code of the container from the chip of the mechatronic customs seal, and write the ID code and the time into the storage module.

A mechatronic customs seal of container, wherein the mechatronic customs seal is internally provided with a detecting wire and a chip written with ID code and inserted through the hole in the bracket and lock rod handle, wherein the mechatronic customs seal is inserted in the hole of the bracket, the detecting wire and the chip in the mechatronic customs seal is electrically connected to the processing circuit in the bracket.

According to the mechatronic customs seal of container, the chip written with ID code is a read-only chip.

According to the mechatronic customs seal of container, the detecting wire is cut off to match the outspread implantation of the mechatronic customs seal synchronously.

According to the mechatronic customs seal of container, the mechatronic customs seal comprises: a bolt, comprising a cylindrical pin packaged with the detecting wire and the chip, and a head arranged on one end of the pin; and a lock head, separated from the bolt when being free, and unable to be removed once inserted with the other end of the pin of the bolt when working.

According to the mechatronic customs seal of container, a number of conducting plates are provided on the outer surface of the bolt of the mechatronic customs seal, which are connected with the detecting wire and the chip respectively.

A bracket of container with electrical monitoring function, mounted on a door of a container, and provided with a hole for fitting a customs seal, wherein internally installed with an antenna, a processing circuit and power with electrical connection thereamong; and the mechatronic customs seal is inserted in the hole of the bracket, the electrical devices within the mechatronic customs seal are electrically connected to the processing circuit in the bracket.

According to the bracket of container with electrical monitoring function, a number of conducting plates, which are connected with the processing circuit, are provided on the wall of the hole on the bracket, the electrical devices within the mechatronic customs seal match the conducting plates to form the electrical circuit connection, while the mechatronic customs seal is inserted into the hole.

According to the bracket of container with electrical monitoring function, the bracket is mounted on the outer side of the door of the container.

According to the bracket of container with electrical monitoring function, the bracket is fixed on the door of the container in a manner that the hole on the bracket and the antenna packaged in the bracket are exposed outside the container, while the rest are located inside the container.

According to the bracket of container with electrical monitoring function, the processing circuit comprises at least one of: a control unit, to process data; an interface management module, connected with the control unit, further connected with the detecting wire and the chip of the mechatronic customs seal while the mechanical-electrical is inserted in the hole of the bracket; a data storage module, connected with the control unit, to store data; a clock module, connected with the control unit, to provide real-time clock; a radio-frequency transceiver module, connected with the control unit and the antenna; a power management module, connected with the control unit, to supply steady electric energy to each module/unit; and a voltage monitoring module, connected with the control unit, to monitor the voltage status of the system.

According to the bracket of container with electrical monitoring function, the processing circuit performs operations as follows: detecting step, to detect the on/off status of the detecting wire of the mechatronic customs seal, send a startup signal to enter next step in case that the detecting wire is on, or send an alarm and write the current time into the storage module in case that the detecting wire is off; reading step, to read the ID code of the container from the chip of the mechatronic customs seal, and write the ID code and the time into the storage module.

The intelligent security apparatus provided by the present invention has physical seal structure and electrical real-time monitoring function at the same time. While checking the integrality of the physical structure via visual observation, the apparatus can also perform electrical real-time monitoring and recording for the seal status, hence to ensure the safety.

Furthermore, the mechatronic customs seal provided by the present invention adopts the principle of integrating mechanism and electronics, and compared with a traditional mechanical seal, the mechatronic customs seal enables automatic recording and storing as well as an automatic wireless recognizing of the seal code and seal status, and automatic detection of the on/off status of the seal and alarm; compared with a common electrical seal, the physical structure of the mechatronic customs seal is one-off, which ensures high security.

Meanwhile, the data storing and transmitting section of the bracket are mounted on the container or embedded inside the container, while only the antenna section and the interface with the seal extend to the outside of the container, in order that, the bracket are reusable, and hence solve the problem of costly traditional one-off electrical seal.

BRIEF DESCRIPTION OF THE ACCOMPANYING FIGURE

In order to achieve better understanding of features and technical contents of the invention, please refer to the accompanying figures as follows. However, the accompanying figures are used as reference and explanation, which do not intend to limit the present invention.

Reference marks in the accompanying drawing are as follows:

1 bracket,
   11 hole for fitting customs seal,
      111 guide slot;
2 mechatronic customs seal,
   21 bolt,
      211 head, 212 pin, 213 guide bar, 214 conducting plate,
   22 lock head;
3 hasp cover,
   31 hole for fitting customs seal, 32 bush;
4 hasp;
5 lock rod handle.

DETAILED DESCRIPTION OF THE INVENTIONS

With reference to the accompanying figures, embodiments of the present invention will be described in detail, and hence the benefits of technical solutions provided by the present invention will be demonstrated obviously.

Figure 1:
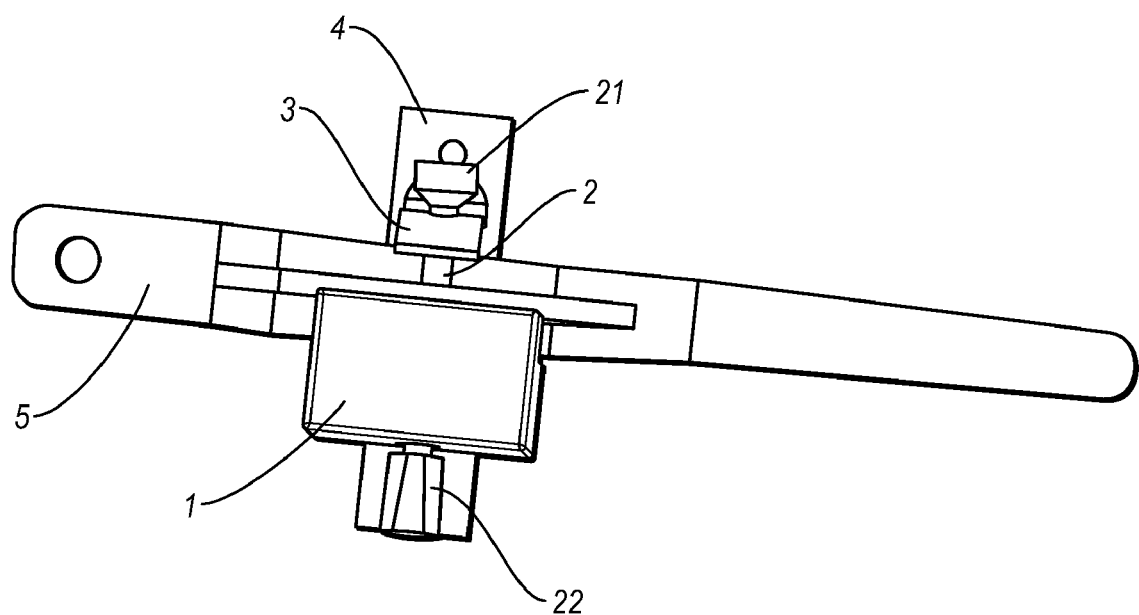
FIG. 1 shows the structure of a mechatronic customs seal and a bracket mounted on a door of a container according to the present invention.
Figure 2:
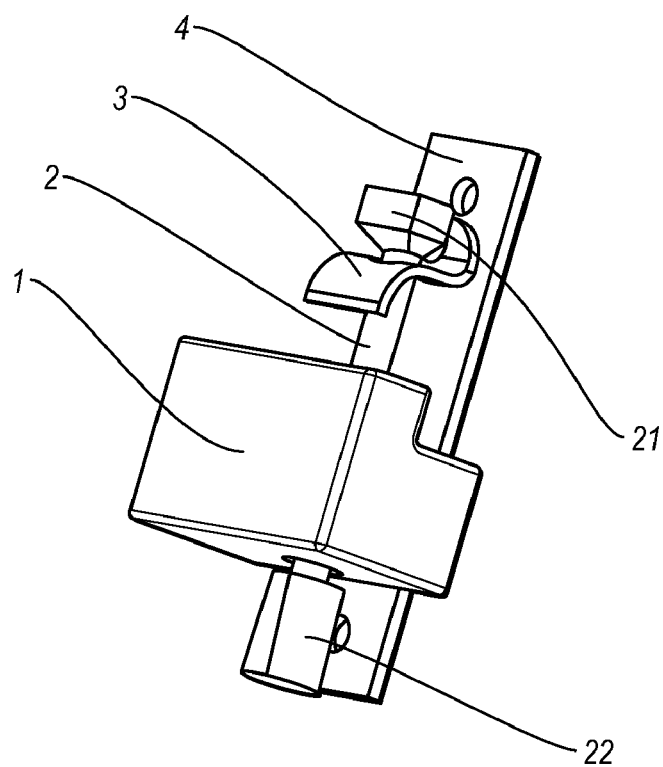
FIG. 2 shows the structure in the FIG. 1 from another perspective, wherein the lock rod handle is not shown.
Figure 3:
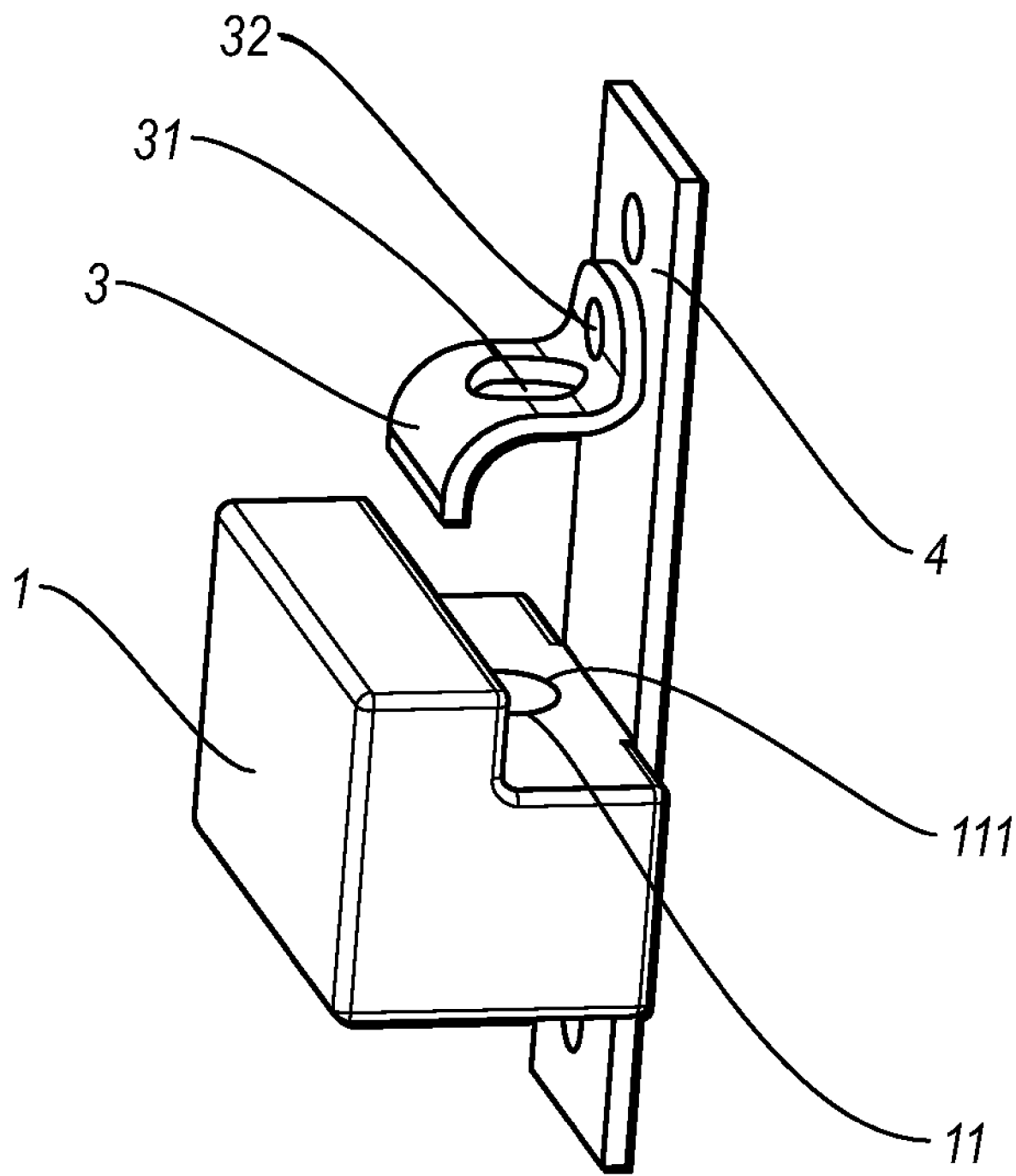
FIG. 3 shows the structure in the FIG. 2 from another perspective, wherein the mechatronic customs seal is not shown.

According to the present invention, FIG. 1~FIG. 3 show the mechatronic customs seal 2 and the bracket 1 that are mounted on a door of a container, wherein, only partial structure of the door (i.e. the hasp 4 on the door) is shown in FIG. 1, and other components of the door, which are not special features of the present invention, will not be detailed herein.

The bracket 1 is fixed on the hasp 4 and provided with hole 11 for fitting customs seal; hasp 4 is pivoted with hasp cover 3 by bush 32 above the bracket 1; and the hasp cover 3 is provided with hole 31 for fitting customs seal accordingly. While the door is closed, lock rod handle 5 is clamped in a space surrounded by the bracket 1, the hasp cover 3 and the hasp 4, and the lock rod handle 5 is provided with a hole for fitting customs seal as well.

Figure 5:
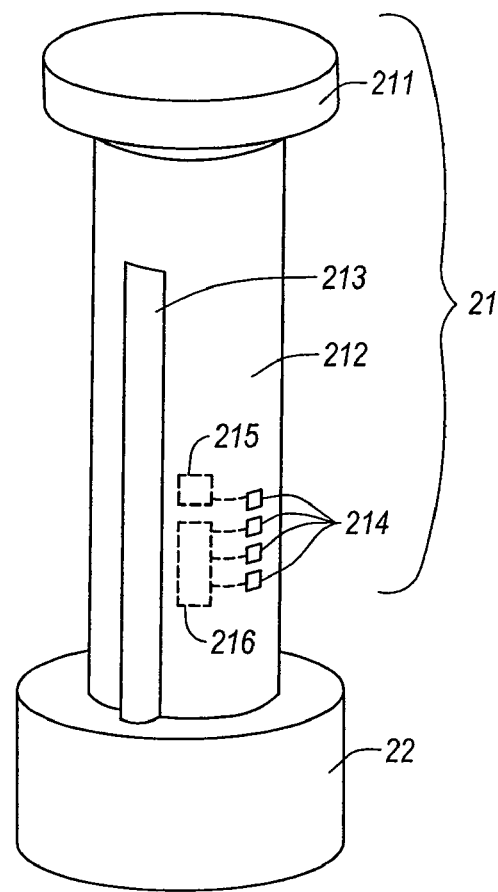
FIG. 5 shows the structure of a mechatronic customs seal according to the present invention.

As shown in FIG. 5, the mechatronic customs seal 2 comprises bolt 21 and lock head 22. The bolt 21 comprises cylindrical pin 212 and head 211, which is fixed on one end of the pin 212, and whose outer diameter is larger than that of the pin 212, and the outer surface of the cylindrical pin 212 is provided with guide bar 213 and four conducting plates 214; wherein, two of the four conducting plates 214 are power and ground respectively, one of the rest is data wire, and the other is on-off detecting end; the bolt 21 is packaged with detecting wire 215 and read-only chip 216 written with ID code, consequentially the detecting wire 215 and the bolt 21 are cut synchronously, and the detecting wire 215 is connected with the on-off detecting end, while the read-only chip 216 is connected with the power, the ground and the data wire; and when being free, the lock head 22 is separated from the bolt 21, and once inserted with the bolt 21, the lock head is unable to be removed.

During sealing, the pin 212 of the bolt 21 is inserted in the hole 31 of the hasp cover 3, the hole of the lock rod handle 5, and the hole 11 of the bracket 1 sequentially, the head 211 on one end of the pin 212 sticks to the hasp cover 3 and the other end is inserted and locked into the lock head 22, then the sealing is completed, so that the lock rod handle 5 could not be rotated unless the mechatronic customs seal 2 is destroyed by force, for example, the pin 212 is cut or the pin 212 is separated from the lock head 22 by force, which destroys the detecting wire at the same time.

As shown in FIG. 3, guide slot 111 and four conducting plates (not shown) are provided on the wall of the hole 11 of the bracket 1, two of the four conducting plates are power and ground, one of the rest is data wire, and the other is on-off detecting end; an antenna, a processing circuit, and a battery as power are installed within the bracket 1.

Figure 4:
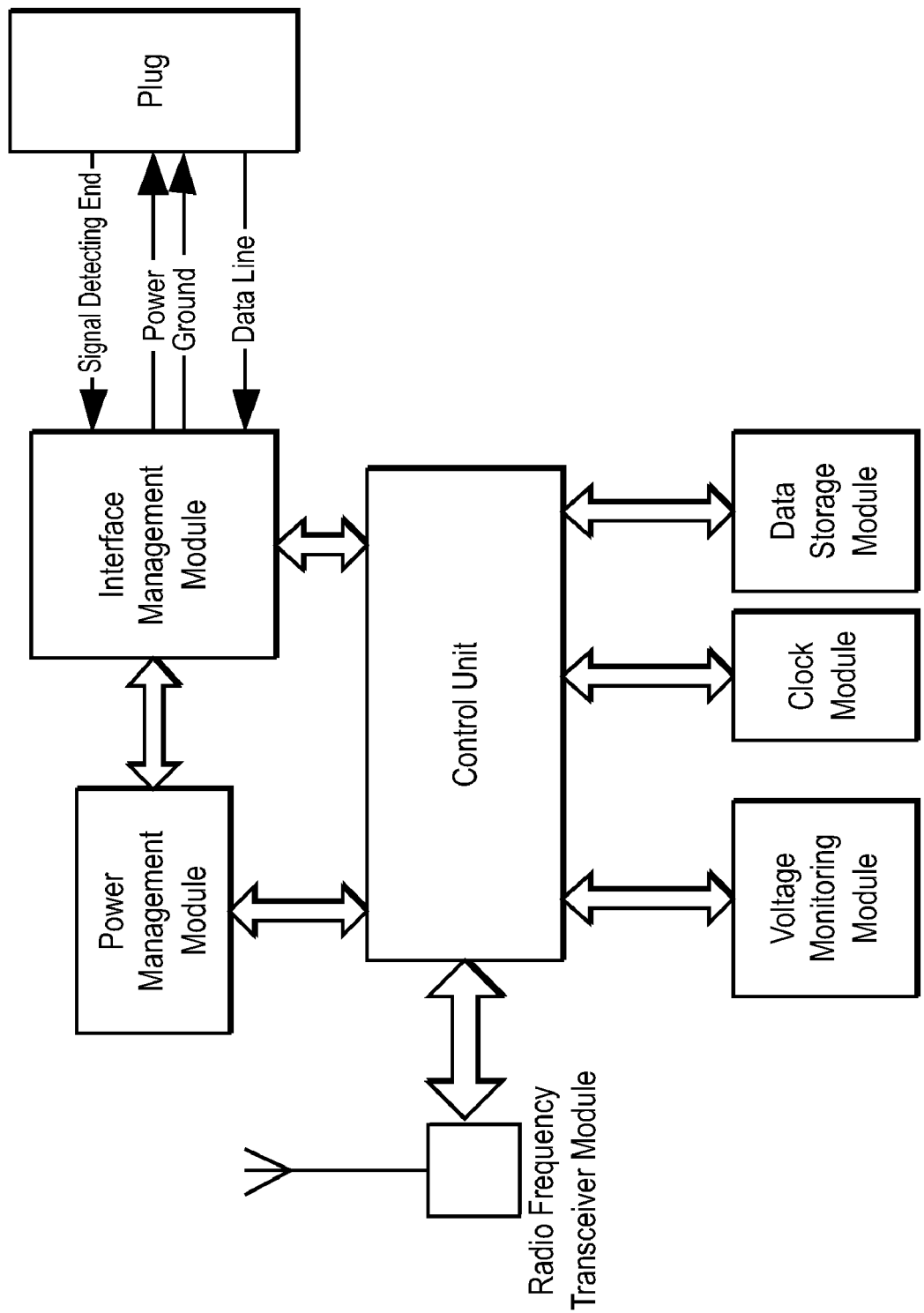
FIG. 4 shows the diagram of the processing circuit of a bracket according to the present invention.

As shown in FIG. 4, the processing circuit comprises a control unit, an interface management module, a data storage module, a clock module, a radio-frequency transceiver module, a power management module and a voltage monitoring module; the control unit processes data; the interface management module is electrically connected with the control unit and the four conducting plates on the wall of the hole 11; the data storage module is connected with the control unit to store data; the clock module is connected with the control unit to provide real-time clock, wherein the on-off information of the detecting wire is integrated with the time information to compose a record to be stored; the radio-frequency transceiver module is connected with the control unit and the antenna for wirelessly receiving and transmitting; the power management module is connected with the control unit, the interface management module and the battery to supply power, the voltage monitoring module is connected with the control unit to provide the monitoring information for the voltage status of the battery, and hence forecast the status and service life of the mechatronic customs seal.

There are two installation modes for mounting the bracket 1 on the door of the container: one is that, the bracket 1 is fixed on the outside of the door of the container; the other is that, the bracket 1 is fixed on the door of the container through the door sheet thereof, wherein the hole of the bracket as well as the antenna packaged in the bracket are located outside the container, while the rest parts of the bracket are located inside the container. The installation mode shown in FIG. 1~FIG. 3 is the first one.

Figure 6:
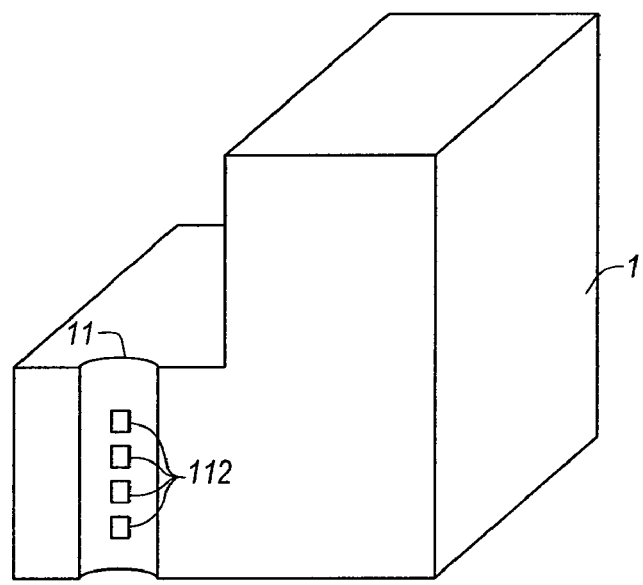
FIG. 6 illustrates an example of conducting plates provided on wall of a hole on the bracket.

When the pin 212 of the bolt 21 of the mechatronic customs seal 2 is inserted into the hole 11 of the bracket, the guide bar 213 is correspondingly inserted in the guide slot 111 to ensure exact inserting location, and the conducting plates on the bracket 1, which are illustrated in FIG. 6 as the coordinating plates 112 on a wall of the hole 11 in the bracket 1, are oppositely connected to the conducting plates 213 on the seal 2, i.e., the processing circuit are conducted with the detecting wire and the read-only chip, and the processing circuit performs operations as follows: if the detecting wire is conducted, the level of the signal on-off detecting end in the interface management module will switch from low to high, and the change of level will generate an interrupt to evoke the processing circuit from sleeping mode, which is to reduce power consumption, and the control unit is initiated to read ID code from the read-only chip and the ID code is stored in the store module in association with the time; while sealing, i.e., inserting the seal into the bracket, if the detecting wire is detected as cut, then an alarm will be generated to report failure, and hence the sealing should not continue; during transportation, once the seal is cut, the detecting wire is cut, the signal detecting end will switch from high to low, and the information will be stored into the storage module by the control unit in association with the corresponding time thereof.

Information of various occurrences such as sealing, unsealing, cutting, enquiry and so on are stored in the data storage module, a external reader may communicate with the processing circuit of the bracket via radio for reading data, to automatically recognize the ID code, seal status detection, history record query and such as are all may be realized.

For the mechatronic customs seal and the bracket, operators perform as follows:

Firstly, the bracket is initiated by an authorized user via reader/writer, during the initiation, the reader/writer communicates with the bracket via radio, and overdue history record stored in the bracket is cleared. When the freight begins, the container number, the manifest number, the sealer code and the sealing time of the freight will be written in. After the seal is inserted and locked, the bracket will recognize the ID code and the on-off status of the seal, and the ID code will be read and stored in the data storage module.

Via network such as GPRS/CDMA, the hand-held reader/writer may transmit the information recognized from the bracket to background data center, including history occurrences record such as the container number, the ID code of the bracket, the ID code of the seal, the seal status, normal operations and alarm.

After validated by the background data center, the container number, the ID code of the bracket, the ID code of the seal and the like are bound together. When the freight is completed, the on-off information of the mechatronic customs seal and the lockage information of the container of the corresponding freight in the bracket will be stored by the background data center as an integrated record. When the freight is completed, users can read the container number, the ID code of the bracket, the on-off information of the corresponding mechatronic customs seal and the like stored in the data storage module of the bracket via reader, and it can be identified that whether an illegal unlocking has happened on the container or not during the transportation, in order to judge whether the container had any security problems during the transportation.

When needing to examine the container, a custom officer or common user cuts the seal and enters the container to examine. After confirmation, another new seal will be mounted, and then the bracket reads and stores the ID code of the new seal, and records the corresponding time through the clock module.

With technical common knowledge of the field, the present invention may be implemented as other embodiments within the spirit or essential features of it. Therefore, for various aspects, the above embodiments are some but not only examples for explaining the present invention. The present invention covers various modifications within the scope of the appended claims.

The invention claimed is:

1. An intelligent security apparatus for container, comprising:
   a bracket, internally installed with an antenna, a processing circuit and power with electrical connection thereamong and mounted on a door of a container;
   a hole for fitting a customs seal, opened on the bracket; and
   a mechatronic customs seal, internally provided with a detecting wire and a chip written with ID code and inserted through the hole in the bracket and a lock rod handle;
   wherein the mechatronic customs seal is inserted in the hole of the bracket, the detecting wire and the chip written with ID code in the mechatronic customs seal is electrically connected to the processing circuit in the bracket.

2. The intelligent security apparatus for container according to claim 1, characterized in that the chip written with ID code is a read-only chip.

3. The intelligent security apparatus for container according to claim 1, characterized in that the detecting wire is cut off to match the outspread implantation of the mechatronic customs seal synchronously.

4. The intelligent security apparatus for container according to claim 1, characterized in that the mechatronic customs seal comprises:
   a bolt, comprising a cylindrical pin packaged with the detecting wire and the chip, and a head arranged on one end of the pin; and
   a lock head, separated from the bolt when being free, and unable to be removed once inserted with the other end of the pin of the bolt when working.

5. The intelligent security apparatus for container according to claim 4, characterized in that first conducting plates, which are connected with the detecting wire and the chip respectively, are provided on the outer surface of the bolt of the mechatronic customs seal;
   second conducting plates, which are connected with the processing circuit, are provided on the wall of the hole on the bracket;
   the first conducting plates match the second conducting plates to form the electrical circuit connection, while the mechatronic customs seal is inserted into the hole.

6. The intelligent security apparatus for container according to claim 4, characterized in that a guide bar is provided on the outer surface of the bolt, a guide slot on the wall of the hole correspondingly, and the guide bar fits in the guide slot accordingly while the mechatronic customs seal is inserted in the bracket.

7. The intelligent security apparatus for container according to claim 1, characterized in that the bracket is mounted on the outer side of the door of the container.

8. The intelligent security apparatus for container according to claim 1, characterized in that the bracket is fixed on the door of the container in a manner that the hole on the bracket and the antenna packaged in the bracket are exposed outside the container, while the rest are located inside the container.

9. The intelligent security apparatus for container according to claim 1, characterized in that the processing circuit at least comprises:
   a control unit, to process data;
   an interface management module, connected with the control unit, further connected with the detecting wire and the chip in the mechatronic customs seal while the mechatronic customs seal is inserted in the hole of the bracket;
   a data storage module, connected with the control unit, to store data;
   a clock module, connected with the control unit, to provide real-time clock;
   a radio-frequency transceiver module, connected with the control unit and the antenna;
   a power management module, connected with the control unit, to supply steady electric energy to each module and unit; and
   a voltage monitoring module, connected with the control unit, to monitor the voltage status of the system.

10. The intelligent security apparatus for container according to claim 1, characterized in that the processing circuit performs operations as follows:
   detecting step, to detect the on/off status of the detecting wire of the mechatronic customs seal, and if it is on, then send a startup signal to enter next step; if it is off, then send an alarm and write the current time into the storage module;
   reading step, to read the ID code of the container from the chip of the mechatronic customs seal, and write the ID code and the time into the storage module.

11. A mechatronic customs seal of container, characterized in that the mechatronic customs seal is internally provided with a detecting wire and a chip written with ID code and inserted through a hole in a bracket and a lock rod handle, wherein the mechatronic customs seal is inserted in the hole of the bracket, the detecting wire and the chip in the mechatronic customs seal is electrically connected to a processing circuit in the bracket.

12. The mechatronic customs seal of container according to claim 11, characterized in that the chip written with ID code is a read-only chip.

13. The mechatronic customs seal of container according to claim 11, characterized in that the detecting wire is cut off to match the outspread implantation of the mechatronic customs seal synchronously.

14. The mechatronic customs seal of container according to claim 11, characterized in that the mechatronic customs seal comprises:
   a bolt, comprising a cylindrical pin packaged with the detecting wire and the chip, and a head arranged on one end of the pin; and a lock head, separated from the bolt when being free, and unable to be removed once inserted with the other end of the pin of the bolt when working.

15. The mechatronic customs seal of container according to claim 14, characterized in that a number of conducting plates are provided on the outer surface of the bolt of the mechatronic customs seal, which are connected with the detecting wire and the chip respectively.

16. A bracket of container with electrical monitoring function, mounted on a door of a container, and provided with a hole for fitting a mechatronic customs seal, the bracket having an internally installed antenna, a processing circuit and power with electrical connection;

and the mechatronic customs seal is inserted in the hole of the bracket, the electrical devices within the mechatronic customs seal are electrically connected to the processing circuit in the bracket.

17. The bracket of container with electrical monitoring function according to claim 16, characterized in that a number of conducting plates, which are connected with the processing circuit, are provided on the wall of the hole on the bracket, the electrical devices within the mechatronic customs seal match the conducting plates to form the electrical circuit connection, while the mechatronic customs seal is inserted into the hole.

18. The bracket of container with electrical monitoring function according to claim 16, characterized in that the bracket is mounted on the outer side of the door of the container.

19. The bracket of container with electrical monitoring function according to claim 16, characterized in that the bracket is fixed on the door of the container in a manner that the hole on the bracket and the antenna packaged in the bracket are exposed outside the container, while the rest are located inside the container.

20. The bracket of container with electrical monitoring function according to claim 16, characterized in that the processing circuit comprises at least one of:

a control unit, to process data;

an interface management module, connected with the control unit, further connected with the detecting wire and the chip of the mechatronic customs seal while the mechatronic customs seal is inserted in the hole of the bracket;

a data storage module, connected with the control unit, to store data;

a clock module, connected with the control unit, to provide real-time clock;

a radio-frequency transceiver module, connected with the control unit and the antenna;

a power management module, connected with the control unit, to supply steady electric energy to each module/unit; and a voltage monitoring module, connected with the control unit, to monitor the voltage status of the system.

21. The bracket of container with electrical monitoring function according to claim 16, characterized in that the processing circuit performs operations as follows:

detecting step, to detect the on/off status of the detecting wire of the mechatronic customs seal, send an startup signal to enter next step in case that the detecting wire is on, or send an alarm and write the current time into the storage module in case that the detecting wire is off;

reading step, to read the ID code of the container from the chip of the mechatronic customs seal, and write the ID code and the time into the storage module.

\* \* \* \* \*